United States Patent
Strachan

(10) Patent No.: US 7,670,428 B2
(45) Date of Patent: Mar. 2, 2010

(54) NON-TOXIC DISPERSANTS FOR HYDRATED LIME SLURRIES

(75) Inventor: Graham George Strachan, Noble Park (AU)

(73) Assignee: Ultimate Nominees Pty Ltd., Noble Park, Victoria (AU)

( * ) Notice: Subject to any disclaimer, the term of this patent is extended or adjusted under 35 U.S.C. 154(b) by 0 days.

(21) Appl. No.: 11/718,900

(22) PCT Filed: Nov. 10, 2005

(86) PCT No.: PCT/AU2005/001720

§ 371 (c)(1),
(2), (4) Date: Jul. 11, 2007

(87) PCT Pub. No.: WO2006/050567

PCT Pub. Date: May 18, 2006

(65) Prior Publication Data

US 2008/0011201 A1    Jan. 17, 2008

(30) Foreign Application Priority Data

Nov. 12, 2004 (AU) .............................. 2004906471

(51) Int. Cl.
*C04B 28/10* (2006.01)
*C04B 28/12* (2006.01)
*B01F 17/06* (2006.01)
*B01F 17/36* (2006.01)

(52) U.S. Cl. .................. 106/795; 106/805; 106/823; 516/204

(58) Field of Classification Search ............. 106/795, 106/802, 805, 823; 516/204
See application file for complete search history.

(56) References Cited

U.S. PATENT DOCUMENTS

| 3,963,655 | A | * | 6/1976 | Monte | 524/53 |
| 6,103,686 | A | * | 8/2000 | Asakawa et al. | 510/479 |
| 6,221,146 | B1 | * | 4/2001 | Fortier et al. | 106/465 |
| 6,294,143 | B1 | * | 9/2001 | Deutsch et al. | 423/432 |
| 2003/0121457 | A1 | * | 7/2003 | Butters | 106/795 |
| 2004/0024156 | A1 | | 2/2004 | Quadir | |
| 2004/0101470 | A1 | | 5/2004 | Rosenberg et al. | |
| 2004/0231567 | A1 | * | 11/2004 | Dulzer et al. | 106/712 |

FOREIGN PATENT DOCUMENTS

| DE | 4306652 A1 * | 9/1944 |
| EP | 0373351 A1 * | 6/1990 |
| EP | 0844213 A1 * | 5/1996 |
| EP | 0 784071 | 7/1997 |
| EP | 1 018497 | 7/2000 |
| FR | 1436930 A * | 5/1965 |
| JP | 01 317117 | 12/1989 |
| JP | 5-32523 A * | 2/1993 |
| JP | 11 090167 | 4/1999 |
| JP | 2002 201497 | 7/2002 |
| WO | WO 02/11856 A1 * | 2/2002 |

* cited by examiner

*Primary Examiner*—Anthony J Green
(74) *Attorney, Agent, or Firm*—Dennison, Schultz & MacDonald

(57) ABSTRACT

A low viscosity aqueous slurry of hydrated lime is obtained by combining as dispersants a carbohydrate such as glucose syrup and a polycarboxylate polymer salt. The slurries obtained exhibit good viscosity stability over practical storage periods.

10 Claims, No Drawings

NON-TOXIC DISPERSANTS FOR HYDRATED LIME SLURRIES

This invention relates to dispersants for use in the preparation of hydrated lime (calcium hydroxide) aqueous slurries. It also relates to hydrated lime aqueous slurries prepared using such dispersants.

BACKGROUND OF THE INVENTION

Hydrated lime has the chemical formula $Ca(OH)_2$. It is also referred to as calcium hydrate, caustic lime and slaked lime. It is typically prepared by the action of water on calcium oxide. It is known to be a skin irritant and has a TLV of 5 $mg/m^3$ of air.

It is advantageous for hydrated lime to be mixed into an aqueous slurry for easier and safer handling as well as facilitating easier processing. For example, hydrated lime is often sold in aqueous slurry form to minimise health and safety problems or to assist in applying the material through metered dosing units. These aqueous slurries may be used in the preparation of plasters and cements. Other uses include water treatment, road stabilisation, steel making and metals extraction. In water treatment applications, it can be used to neutralise acid wastes from many industrial processes and to help flocculate particles that are suspended in water.

Slurries with high concentrations of solids are generally more attractive in the marketplace because transport and handling costs per tonne of dry matter are lower. However, these high solid slurries are more viscous and more difficult to handle. Accordingly, there is a "trade-off" between the desirable high solids and low viscosity.

Dispersants or viscosity modifiers are known, which can be added to an aqueous slurry or paste to lower the viscosity and improve the flow characteristics of the slurry which in turn makes the high-solids product easier to handle. However, many of these additives are toxic and are therefore not suitable for applications involving food or potable water.

It would be desirable to have non-toxic dispersants for the hydrated lime slurries so that the slurries can be safely used in food or water treatment applications.

SUMMARY OF THE INVENTION

This invention provides in one form a low viscosity aqueous slurry of hydrated lime, wherein the slurry comprises a dispersant selected from the group consisting of polycarboxylate dispersants and carbohydrate dispersants.

Preferably, the dispersant comprises a polycarboxylate dispersant in combination with a carbohydrate dispersant.

Preferably, the carbohydrate dispersant is a sugar.

Preferably, the sugar dispersant is glucose syrup.

Preferably, the non-volatile weight ratio of the polycarboxylate dispersant to carbohydrate dispersant is in the ratio 1:20 to 10:1, more preferably 1:20 to 1:1.

In an alternative form, the invention provides a dispersant combination comprising in combination a polycarboxylate dispersant and a sugar dispersant in the non-volatile weight ratio of 1:10 to 1:1.

DETAILED DESCRIPTION OF THE INVENTION

In the present invention the following carbohydrates have been found to be suitable for lowering the viscosity of calcium hydroxide aqueous slurries: aldoses, saccharides, disaccharides, polysaccharides and synthetic derivatives from such precursors, for example, glycerol, sorbitol, mannitol, gluconic, citric, isocitric, lactic, tartaric acids and salts thereof, dextrose, maltose, glucose, lactose, saccharose, maltotriose, maltotetraose, both alpha and beta glucoheptonic acids and salts thereof. Many of these are commercially available in syrup form, e.g., glucose syrup and corn syrup. Carbohydrates are compounds of carbon, hydrogen, and oxygen that contain the saccharose unit or its first reaction product and in which the ratio

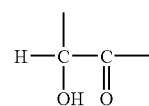

of hydrogen to oxygen is the same as in water. Preferred carbohydrates are sugars, especially glucose syrup. Sugar is a carbohydrate product of photosynthesis comprised of one, two, or more saccharose groups. Glucose syrup (corn syrup) is a mixture of d-glucose, maltose, and maltodextrins made by hydrolysis of cornstarch by the action of acids or enzymes. An example of a suitable product is BLM supplied by the Manildra Group, Sydney. BLM (Brewers Liquid Malt) is a high DE glucose syrup obtained by acid hydrolysis of wheaten starch followed by enzymatic saccharification, purification and concentration. It is supplied as 70% w/w aqueous solution. It has a typical carbohydrate composition of glucose (42%), maltose (35%), maltotriose (4%), and higher saccharides (19%).

Polycarboxylate dispersants are molecules or polymers that contain multiple carboxyl (COOH) groups which can form salts with metals and amine. Examples are styrene maleic anhydride copolymers in the form of their sodium or other alkali metal salts. Generally, excellent performance is achieved when the polycarboxylate dispersant is in the form of an addition copolymer. Suitable copolymers include salts of polyether polycarboxylates. These may be formed from acrylic acid and hydrophilic polyalkylene oxides such as polyethylene and polypropylene oxides. An example of such a copolymer is Ethacryl® G from Lyondell Chemie Nederland B.V. This is a polyether polycarboxylate, sodium salt supplied as a 40% aqueous solution. This copolymer is a comb-branched copolymer.

We have found that when a carbohydrate is used in combination with a polycarboxylate as dispersing agents, there are two major benefits over the use of either product alone. Firstly, a substantially lower total quantity of dispersant is required to achieve a low viscosity slurry. Secondly, the lower viscosity of the slurry is maintained for a far longer period of time. In this specification we refer to the aqueous slurry as having a low viscosity, and this means that the viscosity is sufficiently low to allow adequate flow properties for the metering of the slurries using conventional facilities. In the absence of an additional cellulosic thickener, the viscosity of an aqueous slurry would be typically less than 1000 cps at low shear rates.

We have further found that the polycarboxylate dispersant and carbohydrate dispersant are compatible with each other and can be supplied as a combined dispersant pre-mix to hydrated lime slurry manufacturers.

In addition, combined dispersants are also compatible with methylcellulose (or hydroxypropyl methylcellulose) which can be used to thicken the slurry if required for even longer term stability. This means that a pre-mix can be supplied incorporating both the dispersants and the thickener as a combined package, without the need for separate addition of each of the components to the slurry. This is convenient for an end user.

Other components such as colorants, fungicides and anti-foaming agents may also be added, but they are not essential to the formulation. When used, they are used in art recognised quantities. Furthermore, other dispersants can be used provided the dispersants according to the present invention are incorporated into the aqueous slurries.

Although the mechanism by which the dispersants react with each other and with the calcium ions is not fully understood, it is known that the solubility of hydrated lime is increased in the presence of some carbohydrates, e.g., sucrose. This may contribute to the successful use of the dispersants.

The quantity of dispersant relative to the quantities of water and hydrated lime can be varied to suit the desired viscosity. Typically, the levels of dispersants are in the w/w range relative to the calcium hydroxide of 0.1 to 1% (on a non-volatile basis). The dispersants used in the present invention are non-toxic. By non-toxic, it is meant to be non-toxic to humans at levels that would be encountered in the end use application, for example, water treatment.

The invention will be further described by reference to a preferred embodiment in the following example.

This example illustrates the procedure for reducing the viscosity of a hydrated lime aqueous slurry.

EXAMPLE 1

1. Approximately 1000 g of water was decanted into a lab container.
2. Approximately 3.5 g of glucose syrup* was added and mixed in.
3. Approximately 0.75 g of polycarboxylate copolymer** was added and mixed in.
4. Approximately 1000 g of hydrated lime was added and mixed in.

* BLM from Manildra Group.
  ** Ethacryl G from Lyondell.

This combination led to a low viscosity slurry that was storage stable for at least 48 hours. In this example the non-volatile weight ratio of the polycarboxylate dispersant to carbohydrate dispersant is approximately 1:8.

Since modifications within the spirit and scope of the invention may be readily effected by persons skilled in the art, it is to be understood that the invention is not limited to the particular embodiment described, by way of example, hereinabove.

Where the terms "comprise", "comprises", "comprised" or "comprising" are used in this specification, they are to be interpreted as specifying the presence of the stated features, integers, steps or components referred to, but not to preclude the presence or addition of one or more other feature, integer, step, component or group thereof.

The invention claimed is:

1. An aqueous slurry consisting essentially of:
   hydrated lime,
   water,
   a dispersant for the hydrated lime consisting essentially of a polycarboxylate dispersant based on molecules of polymers that contain multiple carboxyl groups which can form salts with metals and amines, and a sugar carbohydrate dispersant, and
   optionally, a cellulosic thickener.

2. An aqueous slurry as defined in claim 1, wherein the sugar carbohydrate dispersant consists essentially of glucose syrup.

3. An aqueous slurry as defined in claim 1, wherein the polycarboxylate dispersant and the carbohydrate dispersant are present in a weight ratio of 1:20 to 10:1.

4. An aqueous slurry as defined in claim 3, wherein the weight ratio of the polycarboxylate dispersant to carbohydrate dispersant is 1:20 to 1:1.

5. An aqueous slurry as defined in claim 1, wherein the cellulosic thickener is present in the composition.

6. An aqueous slurry as defined in claim 5, wherein the cellulosic thickener is methylcellulose or hydroxypropyl methylcellulose.

7. An aqueous slurry as defined in claim 1, wherein the sugar carbohydrate dispersant consists essentially of sorbitol.

8. An aqueous dispersant pre-mix combination capable of reacting with calcium ions to reduce viscosity in a hydrated lime slurry, consisting essentially of, in combination, a polycarboxylate dispersant based on molecules of polymers that contain multiple carboxyl groups which can form salts with metals and amines, a glucose syrup dispersant, in a weight ratio of 1:20 to 1:1, and, optionally, a cellulosic thickener.

9. A dispersant pre-mix combination as defined in claim 8, wherein the cellulosic thickener is present in the composition.

10. A dispersant pre-mix combination as defined in claim 9, wherein the cellulosic thickener is methylcellulose or hydroxypropyl methylcellulose.

* * * * *